W. ILE.

ELECTRIC PLUG RECEPTACLE.

APPLICATION FILED MAR. 9, 1920.

Reissued Dec. 20, 1921. 15,251.

Inventor.
William Ile
By his Attorney
John Seifert

UNITED STATES PATENT OFFICE.

WILLIAM ILE, OF LYNBROOK, NEW YORK, ASSIGNOR TO HEMES ELECTRIC MANUFACTURING COMPANY INC., OF NEW YORK, N. Y., A CORPORATION OF NEW YORK.

ELECTRIC PLUG-RECEPTACLE.

15,251. Specification of Reissued Letters Patent. Reissued Dec. 20, 1921.

Original No. 1,300,270, dated April 15, 1919, Serial No. 149,458, filed February 19, 1917. Application for reissue filed March 9, 1920. Serial No. 364,518.

*To all whom it may concern:*

Be it known that I, WILLIAM ILE, a subject of the King of Great Britain, residing at Lynbrook, in the county of Nassau and State of New York, (formerly a resident of the city of Toronto, county of York, Province of Ontario, in the Dominion of Canada,) have invented certain new and useful Improvements in Electric Plug-Receptacles, as described in the following specification and illustrated in the accompanying drawings, that form part of the same.

The principal objects of the invention are to provide a neat and simple form of plug receptacle for use in electrical fittings which will be extremely neat in appearance and will be very rigid and the parts will not be susceptible of working loose and causing electrical troubles.

The principal feature of the invention consists in the novel construction and arrangement of an electrical plug and a plurality of socket members electrically connected therewith, whereby the whole is united in a rigid and compact unit, the electrical connections of the shells of the plug and sockets being effectively separated from the central electrical connection.

In the drawing Figure 1 is a side elevational view of a receptacle constructed according to this invention.

Figure 1:
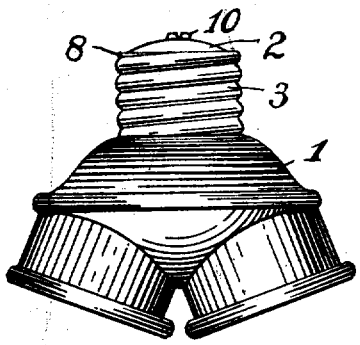
Figure 2:
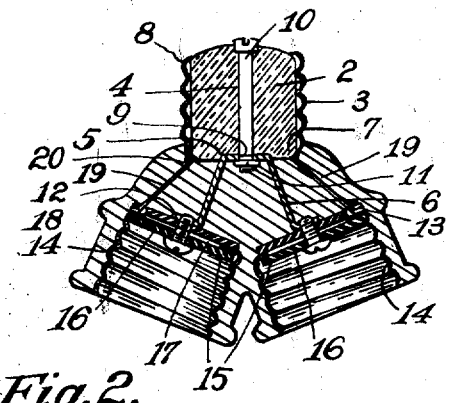
Fig. 2 is a vertical sectional view through the receptacle.
Figure 3:
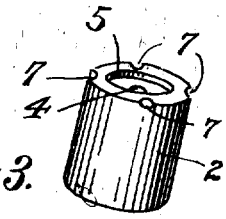
Fig. 3 is a detail perspective view of the porcelain plug or insulator for the contacts of the upper member being shown bottom side up.

Plug receptacles have been marketed for a long time formed of a number of parts secured together in various manners but it is believed that all of these have the common fault of working loose and forming bad electrical contacts which are extremely dangerous.

According to the present invention the plug 1 is formed of an insulator or porcelain block 2 and a threaded metal shell or casing 3. The block 2 is formed with a central hole 4 countersunk at the top and a recess 5 is formed in the bottom end to receive the flat metal member 6.

Notches or recesses 7 are formed in the lower edge of the block 2 into which the bottom edge of the metal casing 3 is indented.

The upper end of the metal casing is flanged inwardly to engage the top of the block 2. When the lower edge is indented into the notches in the block the metal becomes firmly secured to the porcelain. The flat member 6 fits snugly in the recess 5 and is provided with a central hole 9 through which a bolt or contact member 10, which passes through the central hole 4 in the block 2, extends.

A nut 11 is threaded on the lower end of the bolt 10 and locks the member 6 in place. The recess 5 is preferably of circular form so that the top of the metal member 6 may be placed in same. The circular recess is adapted to receive the top of the central member adapted for a three or four socket receptacle. The member 6 is bent downwardly with the ends diverging and the extremities 12 turned laterally which are adapted to receive center contact members 13.

Socket shells 14 are formed of spun sheet metal threaded and having inwardly turned flanges 15 at the top with a large center hole 16.

Disks 17 of insulating material are fitted into the interior of the socket shells 14 at the top end and abutting the flange 15, and corresponding disks 18 are arranged at the outer side of the flanges 15, said disks 17, 18 constituting an insulator closure for one end of the socket shells 14.

The contact members 13 pass through the disks 17 and 18 into the ends 12 of the member 6 and bind the said disks together holding the sockets firmly, and as the said disks are of insulating material the shells are effectively insulated from said contacts 13.

The socket shells 14 are electrically connected with the plug casing 3 by means of metal strips 19 which have flanged ends 20 which fit into the indented portions of the said casing 3 bent into the notches. These strips are firmly soldered in place.

The structure thus formed is then incased in a surrounding jacket of insulating material, such as bakelite, which is molded around the receptacle shells 14 and around the bottom end of the threaded plug casing 3.

All the parts are firmly embedded in a rigid block so that they cannot work loose or become disconnected. The bolt or contact member 10 with the strips 6 and members 13 form the central electrical connections or contact member to the lamps or other plugs secured in the sockets, and the outer shells and threaded metal casing 3 are distinctly and entirely electrically separated from the central connections.

It will be obvious that by a structure as above set forth I have provided a combined connection and plural lamp receiving fixture of an integral rigid and inseparable structure, in which the connection plug includes a threaded shell contact and a contact member the end of which serves as a contact at one end of and insulated from the shell contact, and to the shell contact of which plug a plurality of lamp receiving socket shell contacts are electrically connected, said shell contacts being arranged with an insulator closure at one end, and said insulator closures arranged with center contacts, insulated from the shell contacts by the insular closures, in electrical connection with the center contact member of the plug, and said plug contact shell and said lamp receiving contact shells being combined and united into an integral and rigid one piece structure by a mass of insulating material molded around the lamp receiving contact shells and the inner end of the plug shell contact with the electrical connections of the shell contacts and the connections of the center contacts of the shells and plugs embedded therein and effectively separated and insulated from each other, whereby there is no possibility of such connections becoming loose or disconnected with the consequent electrical troubles.

What I claim as my invention is:—

1. A plug receptacle, comprising a plug of insulating material having a single hole extending therethrough from end to end, a threaded metal casing encircling a portion of said plug, a bolt extending through the hole in said plug, a metal member secured to said bolt and carrying branch electrical contacts, socket shells connected with, and insulated from, said central metal member, flexible electrical connections secured to the exterior of said socket shells and to the inward end of the plug casing, and a unitary mass of insulating material surrounding said socket shells and the inward end of the plug casing and completely embedding the electrical connections between the plug and the sockets.

2. A plug receptacle, comprising a circular plug having notches in the edges and a central orifice and a recess in the bottom communicating with said orifice, a threaded metal casing surrounding said plug and having indents extending into said notches, a bolt extending through the central orifice in said plug, a central metal member secured on said bolt and fitting in said recess; said central member extending angularly outward from said plug and having laterally turned ends, a pair of insulating disks secured to each of the ends of said central member, socket shells held between said insulating disks, metal strips connected to said socket shells and to said plug casing, and a mass of insulating material molded around said shells and the lower end of said plug and incasing the intermediate connections.

3. A plug receptacle, comprising a plug of insulating material and having a recess in the inner end, a threaded metallic casing encircling said plug, a bolt extending through said insulated center, a metal member secured to said bolt and fitting into the recess in said plug, threaded metal socket shells having inturned flanges at the upper ends, metal strips rigidly secured at one end to said plug casing and at the other end to the flange ends of said socket shells, central contacts for each of said sockets secured to the central metal member and insulated from said shells, and a unitary mass of insulating material molded around and embedding said shells and electrical connections.

4. An electric connector, comprising a connection plug including a block of insulation material, a threaded shell contact encircling said block and a center contact, a lamp receiving shell arranged with a center contact insulated therefrom, means electrically connecting the center contacts of the plug and lamp receiving shell consisting of an electric conductor connected to said contacts, means electrically connecting the lamp receiving and plug shells consisting of an electric conductor secured directly to the shells, and a mass of insulating material molded around the lamp receiving shell to connect the plug and lamp receiving shells in an integral rigid structure and in embedding relation to the electric connecting means of the shell and plug, and said electric connecting means being sufficiently rigid to retain the parts in their relative position during the molding operation.

5. An electric connector, comprising a connection plug including a block of insulating material, a threaded shell encircling the block and a center contact member, lamp receiving shells electrically connected with the shell contact of the plug, center contacts for the respective lamp receiving shells and insulated therefrom, means for electrically connecting the center contacts of the lamp receiving shells with the center contact of the plug and support the shells at an angle and in spaced relation to the plug, and a mass of insulating material molded around the lamp receiving shells and embedding the electrical connections of said shell contacts with the plug contacts and insulating said connections from each other and connecting the lamp receiving shells and plug into a rigid integral one piece structure.

6. An electric connector, comprising a block of insulating material, a metallic shell contact encircling said block, a plurality of threaded metallic lamp receiving shell contacts, an electric conductor extending through the insulator block arranged with a center contact terminal at the outer end of the block, center contacts for the lamp receiving shell contacts electrically connected to said conductor and insulated from the lamp shell contacts, means for electrically connecting the block and lamp shells, said last named means consisting of an electric conductor soldered directly to the shells, and a mass of insulating material surrounding the lamp receiving shells and in embedding relation to said electric connecting means between the shells and insulator block and connecting said insulator block and lamp receiving shells into a unitary rigid integral structure, and said electric connecting means serving as a means to maintain the block and lamp receiving shells in relative spaced relation during the molding of said material about the same.

7. An electric connector comprising a connecting plug including a block of insulating material, a threaded shell encircling the block and a center contact member lamp receiving shells arranged at an angle to each other and electrically connected with the shell contact of the plug, center contacts for the respective lamp receiving shells and insulated therefrom, means for electrically connecting the center contacts of the lamp receiving shells with the center contact of the plug and a mass of insulating material around the lamp receiving shells and embedding the electrical connections of said shell contacts with the plug contacts and insulating said connections from each other and connecting the lamp receiving shells and plug into a rigid integral one piece structure.

WILLIAM ILE.